2 Sheets—Sheet 1.

J. H. PALM.
RIDING-CULTIVATORS.

No. 194,366. Patented Aug. 21, 1877.

Witnesses;
Grenville Lewis
Chas. O. Gill

Inventor
James H. Palm
by his attys
Coy Coy.

2 Sheets—Sheet 2.

J. H. PALM.
RIDING-CULTIVATORS.

No. 194,366. Patented Aug. 21, 1877.

Witnesses:
Granville Lewis
Chas. P. Gill

Inventor
James H. Palm
by his Attys.
Cox & Cox

UNITED STATES PATENT OFFICE.

JAMES H. PALM, OF LEXINGTON, OHIO.

IMPROVEMENT IN RIDING-CULTIVATORS.

Specification forming part of Letters Patent No. 194,366, dated August 21, 1877; application filed January 17, 1877.

*To all whom it may concern:*

Be it known that I, JAMES H. PALM, of Lexington, in the county of Richland and State of Ohio, have invented a new and useful Improvement in Riding-Cultivators, of which the following is a specification, reference being had to the accompanying drawings.

The invention relates to an improvement in riding-cultivators; and consists in the mechanism hereinafter specifically described, the object being to furnish a cultivator which shall be adjustable in all of its parts, so that soil may be effectually worked.

Figure 1:
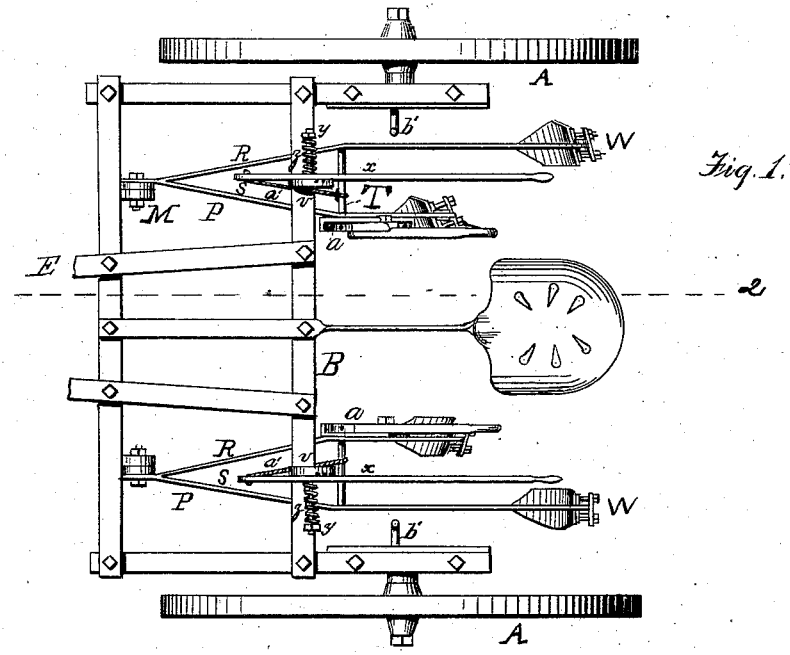
Figure 2:
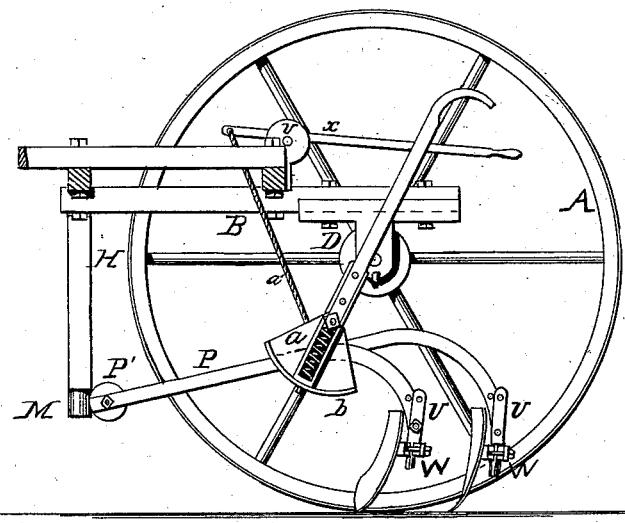
Figure 3:
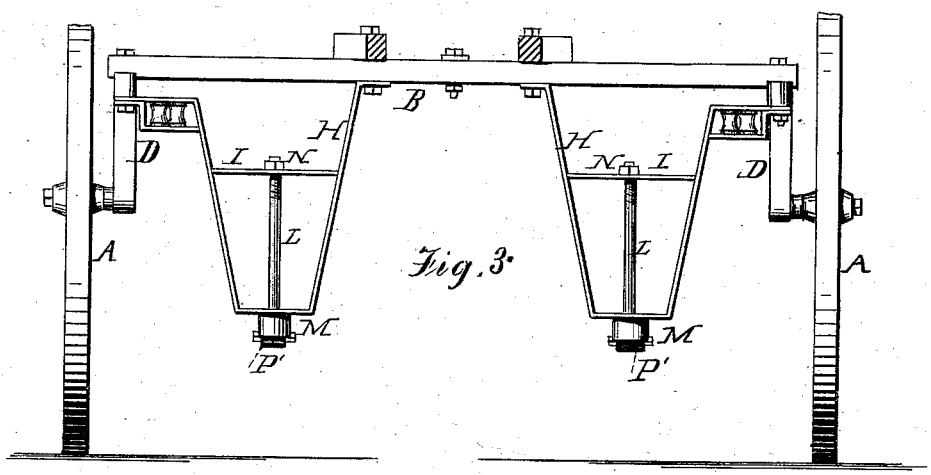
Figure 4:
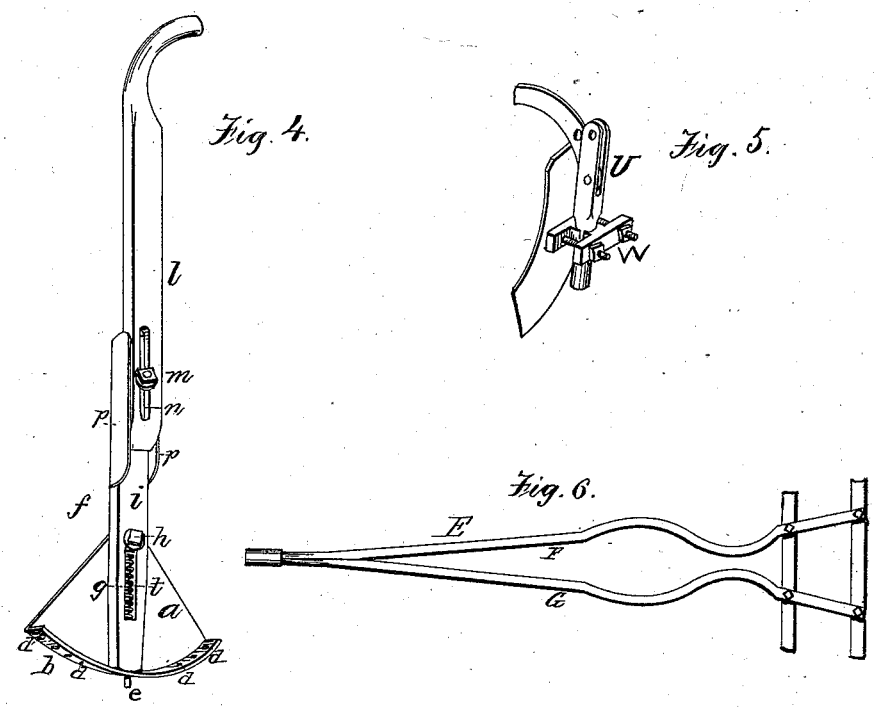
Figure 5:
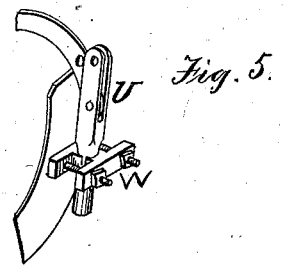
Figure 6:
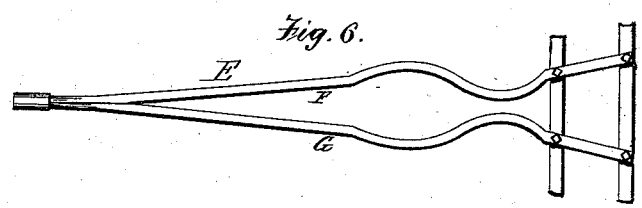

Figure 1 is a top view of a device embodying the elements of the invention. Fig. 2 is a section through the line 1 2 of Fig. 1. Fig. 3 is a front view of Fig. 1. Fig. 4 is a detached perspective view of one of the handles. Fig. 5 is a like view of a plowshare, and Fig. 6 is a top view of the tongue.

In the accompanying drawings, A represents the wheels upon which the frame B is mounted by means of the hangers D secured on each side thereof. Upon the upper surface of the frame B, and extending forward, is secured the tongue E, which is composed of the shafts F G united at their forward end and separated a suitable distance at their rear, the parts near the front edge of the frame being so curved as to nearly impinge each other; and immediately in front of this the curves are just reversed, forming an enlargement, as shown, which gradually tapers to a point where the two shafts are united, constituting the end of the tongue.

The object of this form of tongue is to keep the horses spaced, which is effected by the separation of the pieces into the loop or opening, but at the same time permits them to turn easily and readily without their flanks or hips coming in contact with the tongue, which, for this end, is made concave in rear of the loop or enlargement; hence the device forms a decided improvement over the old split tongue, which inclined from a broad base to a narrow tip.

The hangers H are rigidly secured beneath the front edge of the frame B, and depend vertically downward a proper distance, each of them being provided at their central parts with a brace, I.

In the vertical center of the hangers H are furnished the threaded posts or swivels L, the upper ends of which pass through apertures in the braces I, and are provided with nuts N, their lower ends being set in the shoes M, which have a pivotal movement corresponding with that of the post L.

It is obvious that, by means of the nut N, the shoe M may be raised or lowered, as desired.

To the side of the shoe M is loosely pivoted the plate or disk P′, to which is rigidly secured the end of the plow-beam P, which is composed of the two parts R S connected by the threaded brace T, the distance between the parts increasing from front to rear, and one part being of greater length than the other. At their rear ends the beams R S curve downward, and are furnished with the forked hangers U pivoted at the termination of the fork to the extremity of the plow-beam, the remaining portion of the fork extending upward, and being adjustably secured either to the plow-beam, or behind it, or otherwise, as desired, according to the angle of the plowshare.

The lower portion of the hanger U extends downward, and is attached in the pillow or plumber block W secured upon the back of the plowshare. These plumber-blocks are of the usual form, and are capable of receiving different sizes of hanger.

The plow-beam, through the swivel L and shoe M, has both a lateral and an oscillating movement, and is provided on its side with a quadrant, *a*, having its circular edge downward, and provided with a horizontal flange, *b*, in which are constructed the apertures *d* to receive the point of the engaging-pin *e* rigidly to or constructed with the lower portion of the handle *f*.

The handle *f* is secured near its lower extremity to the quadrant *a* by the pivot *h*, and is composed of the two parts *i l*, the upper portion of the part *l* being suitably conformed to insure ease to the operator, and its lower extremity furnished with the set-screw *m*, which protrudes through the slot *n* formed in the upper portion *l* of the handle *f*, and serves to retain that part in juxtaposition to the part *i* and between the flanges *p*, wherein it has a vertical movement, and is capable of being extended or retracted to suit the length of the arm of the operator, the set-screw being provided to secure it in such adjusted position, and also as a guide-pin. The lower portion of the handle $f$, below the pivot $h$, is furnished with an elongated slot, $t$, in which the spring $g$ is placed, the purpose of which spring is to force the pin $e$ back to place, and render its operation automatic.

Upon each side of the driver's seat is secured to the frame B the ratchets $v$, provided with teeth, which engage a stud secured on the lever $x$, which is retained in proper position by the center-pin $y$ and spring $z$, secured to the ratchet. To the lower end of the lever is attached one end of the rope or chain $a'$, its other end being fastened to the plow-beam, the purpose of which ratchet, lever, and chain is to elevate or depress the plows, as desired.

Upon the under surface of the hangers D are provided the hooks $b'$, whereon the plow-beams may be rested when conveying them over a road or other place where they are not designed to be used.

The operation of the invention will appear from the foregoing, and will hardly require other explanation.

What I claim as my invention, and desire to secure by Letters Patent, is—

1. The tongue E, provided with the contraction and swell, substantially as shown and described.

2. The handle $f$, composed of the parts $i\ l$, in combination with the flanged quadrant $a$, the lower portion of the handle being provided with a spring, $g$, arranged to project a pin, $e$, beyond the end of the handle, substantially as shown and described.

3. A cultivator-handle pivoted upon its bolt and provided with a spring device to engage it rigidly with its plow-beam, whereby the handle is held in working position or released and adjusted at various heights by elevating the handle itself, substantially as set forth.

4. A cultivator-handle, $f$, provided with the spring $g$ and pin $e$, in combination with the flanged quadrant $a$, substantially as set forth.

5. The lever $x$, pivoted on the center-pin $y$ of the circular ratchet $v$, which forms a bearing for the lever upon one side and an engaging ratchet upon the other, and provided with the spring $z$ and stud $w$, substantially as shown and described.

In testimony that I claim the foregoing improvement in riding-cultivators, as above described, I have hereunto set my hand this 12th day of January, 1877.

JAMES H. PALM.

Witnesses:
GEORGE MOORHOUSE,
N. N. LYMAN.